No. 836,441. PATENTED NOV. 20, 1906.
J. J. DOMEK, Jr.
DUST PROOF ASH SIFTER.
APPLICATION FILED APR. 25, 1906.
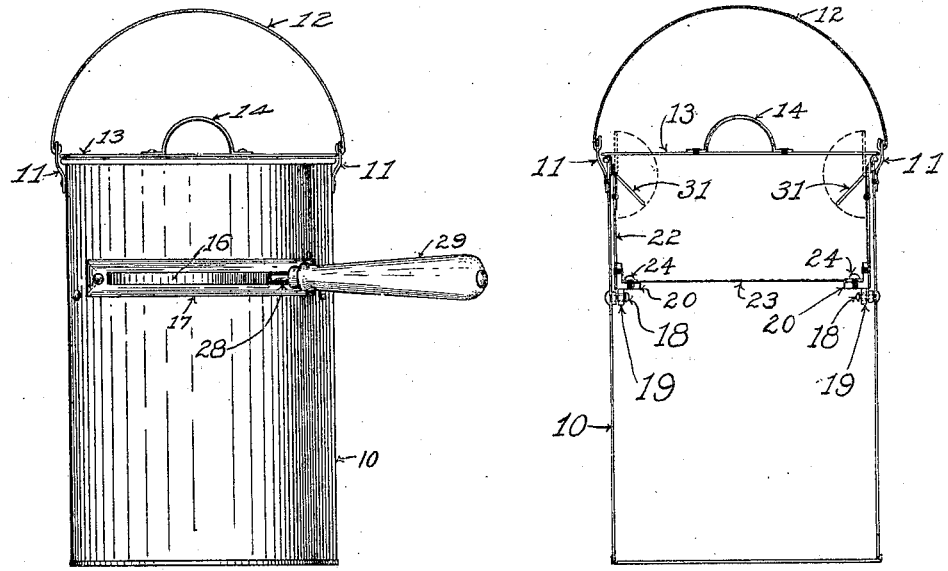
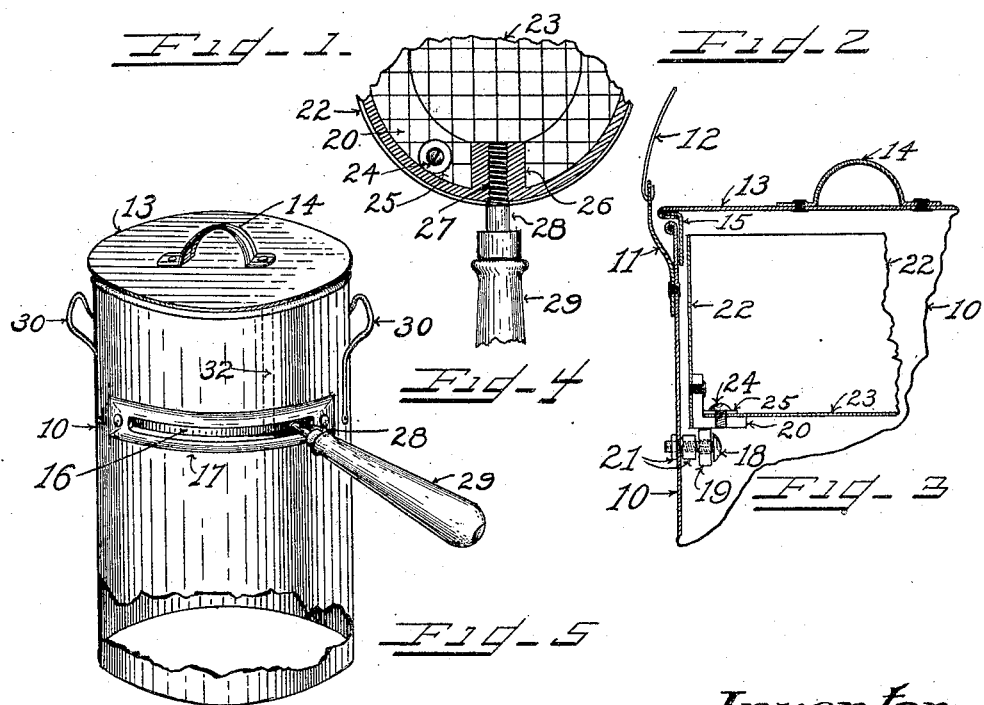
Witnesses.
W. C. DeLonge
M. A. Nyman
Inventor:
Joseph J. Domek, Jr.
per
Chas. C. Tillman
Attorney.

UNITED STATES PATENT OFFICE.

JOSEPH J. DOMEK, JR., OF CHICAGO, ILLINOIS.

DUST-PROOF ASH-SIFTER.

No. 836,441.

Specification of Letters Patent.

Patented Nov. 20, 1906.

Application filed April 25, 1906. Serial No. 313,566.

*To all whom it may concern:*

Be it known that I, JOSEPH J. DOMEK, Jr., a citizen of the United States, residing at Chicago, in the county of Cook and State of Illinois, have invented certain new and useful Improvements in Dust-Proof Ash-Sifters, of which the following is a specification.

This invention relates to improvements in a device to be used for sifting ashes, so as to separate the same from the unburned pieces of fuel, such as coal and the like; and it consists in certain peculiarities of the construction, novel arrangement, and operation of the various parts thereof, as will be hereinafter more fully set forth and specifically claimed.

The principal object of the invention is to provide an ash-sifter which shall be simple and inexpensive in construction, strong, durable, and effective in operation, and so made that during the operation of sifting the ashes, which may be carried on within a room or out of doors, no dust will escape therefrom.

Another object is to provide means whereby the rotary sifter may be moved back and forth within the outer cylindrical vessel in an easy and noiseless manner and when desired may be readily removed from said cylindrical vessel, so that the ashes may be emptied from the latter and the unburned pieces of fuel from the former.

Other objects and advantages of the invention will be disclosed in the subjoined description and explanation.

In order to enable others skilled in the art to which my invention pertains to make and use the same, I will now proceed to describe it, referring to the accompanying drawings, in which—

Figure 1 is a front view in elevation of an ash-sifter embodying my invention, showing the handle for operating the sifter or sieve. Fig. 2 is a central vertical sectional view showing by dotted lines the positions to which the handles used for removing the sieve or sifter may be turned when the cover is displaced. Fig. 3 is an enlarged sectional view of a portion of the upper part of the outer vessel and its cover, showing a portion of the sifter located therein. Fig. 4 is a plan view, partly in section, of a portion of the sifter and a part of the handle for operating the same; and Fig. 5 is a perspective view of a modified construction of the device.

Like numerals of reference refer to corresponding parts throughout the different views of the drawings.

The reference-numeral 10 designates the outer vessel, which is cylindrical in shape, as shown, and may be made of any suitable size and material, but preferably of metal. Secured to the upper portion of the vessel 10, and at points about diametrically opposite each other, are upwardly-extending apertured plates or ears 11, in the apertures of which are secured the ends of a bail 12 used for moving the vessel from one place to another. The top of the vessel 10 is closed by means of a cover 13, which is provided at its center with a handle 14 for moving the same. This cover is provided with a downturned annular flange 15, which fits snugly in the upper portion of the vessel 10, so as to prevent the escape of dust. At a suitable distance from its upper end the vessel or receptacle 10 is provided with a horizontally-extending slot 16, over which is placed and secured to the outer surface of the vessel 10 a plate 17, which has a slot disposed to aline with the slot 16, as will be readily understood by reference to Figs. 1 and 5 of the drawings. At suitable points on a horizontal plane, just below the slot 16, the vessel 10 is provided with a number of inwardly-extending stubshafts 18, on each of which is mounted an antifriction-roller 19 to serve as rests for the annular rim 20 of the sifter. These stubshafts are usually in the form of a headed screw, as shown in Fig. 3, and may be adjustably held in place by means of nuts 21 on the inner and outer surfaces of the vessel 10, the inner nuts also serving to hold the rollers 19 at a distance from the outer vessel, thus permitting them to have free movement and to be adjusted inwardly or outwardly, so that they may contact with the bottom of the sifter near its periphery, or inwardly therefrom, or so that sifters of different diameters may be used.

The sifter consists of an annular rim 20, which is angular in cross-section, as shown in Figs. 2 and 3, and a cylinder 22, which is secured to the vertical portion of the rim 20 and is of sufficient size to fit snugly in the vessel 10, yet at a sufficient distance therefrom to permit the annular flange 15 on the cover 13 to extend downwardly between its upper portion and the upper portion of the outer vessel. Located horizontally on the upper surface of the horizontal part of the rim 20 is a screen or sieve 23, which may be held in place by means of a number of screws 24 and washers 25 thereunder, which screws engage the horizontal portion of said rim, as is clearly shown in Figs. 2 and 3 of the drawings. The rim 20 is provided with an inwardly-extending lug 26, which has a screw-threaded opening 27 to receive the inner and screw-threaded end 28 of a handle 29, which is inserted through the slot 16 of the outer vessel, as shown in Figs. 1 and 5, and is used for moving the sifter back and forth.

By reference to Figs. 2 and 3 it will be seen that the rim 20 of the sifter will rest on the rollers 19, so that its movement will be easy and comparatively noiseless. It will also be observed by reference to Fig. 2 that the cylindrical portion 22 of the sifter has hinged to its upper portion, at opposite sides thereof, handles 31, which may be turned to the position indicated by dotted lines in Fig. 2 and are used for removing the sifter from the outer vessel.

In Fig. 5 I have shown a modification in the construction of the device, which consists in omitting the ears 11 and bail 12 and securing to the sides of the vessel 10 at opposite points handles 30, used for lifting or transporting the vessel. In this modified construction the bottom of the vessel 10 is left open, as shown, so that said vessel may be placed on the ground, when the ashes may be sifted and allowed to fall directly on the ground instead of being retained in the vessel 10, as in the construction illustrated in Figs. 1 and 2 of the drawings and above described. In some instances I may provide the vessel 10 and the plate 17 with a vertical slot 32, which communicates with the slot 16, so that the cylindrical sifter may be lifted out of the vessel 10 without removing the handle 29, which may be done by turning the sifter until the portion 28 of the handle is located at a position to enter the slot 22, when it is apparent that it may be passed out through said slot.

Having thus fully described my invention, what I claim as new, and desire to secure by Letters Patent, is—

In an ash-sifter, the combination with a cylindrical vessel having a horizontal slot at a suitable distance below its upper end, of a series of screw-threaded and headed stubshafts located in said vessel on a horizontal plane near the said slot, a roller on each of said shafts, a pair of nuts located on each of said shafts one on the inner and the other on the outer side of said vessel, a cylindrical sifter having a sieve horizontally located in its bottom and resting on said rollers, a screw-threaded apertured lug on the sifter, and a handle having a threaded portion to engage said lug and extending through the slot in the outer vessel, substantially as described.

JOSEPH J. DOMEK, Jr.

Witnesses:
PAUL DOMEK,
CHAS. C. TILLMAN.